Patented Apr. 25, 1944

2,347,252

UNITED STATES PATENT OFFICE 2,347,252

DYESTUFFS OF THE ANTHRAQUINONE SERIES

Edwin C. Buxbaum, Swarthmore, Pa., assignor to E. I. du Pont de Nemours & Company, Wilmington, Del., a corporation of Delaware No Drawing. Application July 25, 1940,
Serial No. 347,487

7 Claims. (Cl. 260—276)

This invention relates to the preparation of dyestuffs of the anthraquinone series and has for its object the preparation of new acid wool dyestuffs of the anthraquinone naphthcarbazole class which dye animal fibers in desirable shades, and exhibit good tinctorial and fastness properties.

It is generally considered in the preparation of dyestuffs of the acid wool class in the anthraquinone series that when the size of the molecule becomes larger the shades of the resulting dye become duller so that they become of little or no value as dyestuffs for wool and similar fibers.

I have found that new dyestuffs of high molecular weight may be prepared which dye wool and similar fibers in strong and bright shades of good fastness properties. Because of the nature of the molecule, a large variety of dyes can be produced in this particular series which exhibit similar dyeing properties. These dyes are the sulfonation derivatives of the compounds of the general formula,

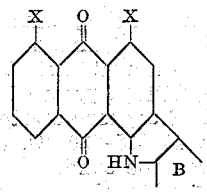

wherein one X stands for the radical —NH—R in which R stands for an aroyl radical of the anthraquinone series and B for the naphthalene nucleus.

According to my invention, amino halogen anthraquinone compounds are reacted with acid chlorides of the anthraquinone series and the resulting aroylamino-halogen anthraquinones are condensed with alpha or beta naphthylamine and subjected to a condensation reaction to effect what is believed to be a ring closure of the naphthylamine group, and sulfonation of the resulting molecule. The carboxylic acid chlorides of the anthraquinone series which may be employed will include those in which the carboxylic acid group is directly attached to the anthraquinone nucleus or to a ring which comprises part of a ring system which includes the anthraquinone nucleus. The condensation of the acid chloride with the amino halogen anthraquinone and the condensation of the resulting compound with the naphthylamine are effected by any of the known processes. The naphthylamino anthraquinone may be simultaneously ring closed and sulfonated by means of oleum of from 5 to 60%.

The water soluble dye resulting from the sulfonation may be isolated by pouring the mass into water, filtering and washing in the usual manner. By varying the type of acid chloride of the anthraquinone series a large variety of shades may be produced within the class of compounds all of which may be dyed on animal fibers from the usual acid solutions and exhibit similar dyeing properties.

It is of course understood that the naphthylamine may be condensed with the halogen-amino-anthraquinone first, and the resulting compound then condensed with the desired acid chloride of the anthraquinone series, if desired.

The following examples are given to illustrate the invention. The parts used are by weight.

Example 1

Thirty and one-half parts of the condensation product of 1-amino-5-chloro-anthraquinone and 2:1-anthraquinone - benzacridone - 3' - carbonyl chloride are reacted with 24 parts of beta-naphthylamine in the presence of 30 parts of potassium acetate, 0.4 part of copper acetate and 320 parts of naphthalene at 210–215° C. for a period of eight hours. When the condensation is completed, the charge is allowed to cool to 140° C. over a period of three hours and then diluted with 640 parts of solvent naphtha. The diluted reaction mass is held at 100–110° C. for 2 hours additional and then cooled to room temperature in 2 to 4 hours. It is then filtered and the residue washed with 320 parts of solvent naphtha. It is then washed with 320 parts of alcohol and finally with hot water and dried at 100–110° C. The product obtained corresponds to the following formula

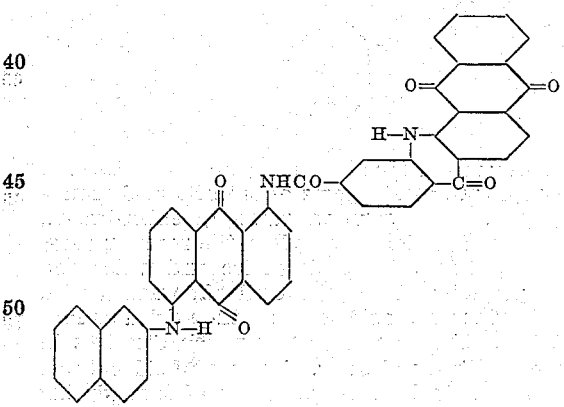

It is a red compound which dissolves in organic solvents with a bright red color. It dissolves in 93% H₂SO₄ with a brown color.

Ten parts of the above compound are dissolved in 100 parts of sulfuric acid monohydrate over a period of one-half to one hour. The color changes rapidly from a green-brown to a bright green. When solution is entirely complete and the color of the acid is green without any brown coloration, there are added 5 parts of 65% oleum. The solution is allowed to agitate at 30–35° C. for one hour and then tested for water solubility. When one drop of this acid solution dissolves in 10 cc. of cold water sulfonation is considered to be complete. When the sulfonation is complete, the acid reaction mass is poured into 800 parts of ice and water. The precipitated color is filtered, washed acid free with 10% brine and dried at 100–110° C. This product dyes wool in pleasing shades of brown-red which have good leveling properties.

*Example 2*

Thirty and one-half parts of the condensation product of 2:1-anthraquinone-benzacridone-3'-carbonyl chloride and 1-amino-4-chloroanthraquinone are reacted with 24 parts of beta-naphthylamine in the presence of 30 parts of potassium acetate, 0.4 part of copper acetate and 320 parts of naphthalene for eight hours at 210–215° C. The color of the condensation mass changes gradually from a red shade to blue. When the condensation is completed, the charge is cooled to 140° C. over a period of three hours and diluted with 640 parts of solvent naphtha. The diluted reaction mass is held at 100–110° C. for two hours additional and then cooled to 30–40° C. in 3–4 hours. It is then filtered, washed with 320 parts of solvent naphtha and 320 parts of ethyl alcohol. It is then washed with hot water and dried at 100–110° C. The product obtained is a dark blue powder which dissolves in organic solvents with a red color. It dissolves in 93% sulfuric acid with a brown color. It corresponds to the following formula

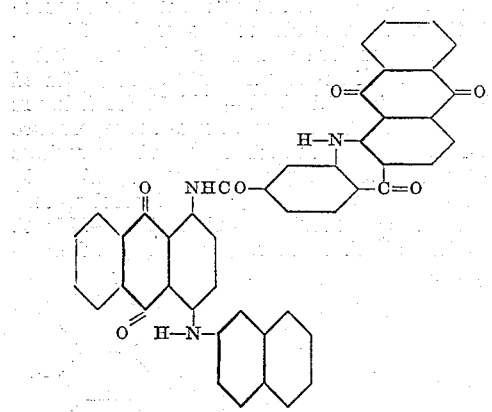

Ten parts of the above compound are dissolved at 30–35° C. in 100 parts of sulfuric acid monohydrate. The solution turns greenish-brown. When sulfonation is complete, the reaction mass is poured into 800 parts of ice and water and the precipitated color filtered off, washed with 10% brine until acid free and then dried at 100–110° C. It is a red powder which dissolves in water with a red color. From an acid bath, it dyes wool in brown-red shades of level dyeing properties. It is redder than the product obtained in Example 1.

*Example 3*

Eight parts of the condensation product of 1-chloro-2-anthraquinone carboxylic acid chloride and 1-amino-5-chloro-anthraquinone are reacted with 10 parts of beta-naphthylamine in the presence of 8 parts of potassium acetate, 0.5 part of copper acetate and 100 parts of ortho-dichlorobenzene at 175–180° C. for 4 hours. The solution turns red very rapidly. When the condensation is complete, the reaction mass is cooled to 30° C. over a period of 4 hours. It is then filtered, washed with alcohol and hot water and dried. The compound is a red substance of the following formula:

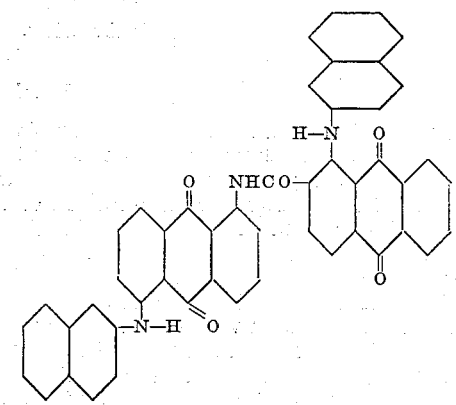

When the above compound is sulfonated in the usual manner with sulfuric acid monohydrate and oleum a dark green solution is obtained which when poured into a mixture of ice and water gives a yellow precipitate. This precipitated dyestuff is filtered off, washed acid free and dried. It dyes wool in orange-yellow shades.

*Example 4*

Twenty-six parts of the product obtained from the condensation of 1-amino-5-chloro-anthraquinone and 1:9-anthrathiazole-2-carbonyl chloride are reacted with 21 parts of beta-naphthylamine, 0.3 part of copper acetate and 200 parts of naphthalene at 215–220° C. for a period of 4–8 hours. When the condensation is complete, the reaction mass is cooled to 130° C. and there are then added 500 parts of solvent naphtha. The diluted reaction mass is then cooled to room temperature over a period of eight hours and then filtered, washed with additional solvent naphtha and finally with ethyl alcohol and hot water. The compound so obtained corresponds to the following formula

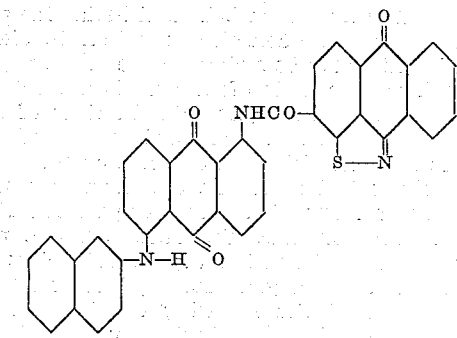

Five parts of the above product are dissolved in 100 parts of sulfuric acid monohydrate and sufficient 65% oleum added to sulfonate the base. When sulfonation is complete, the acid solution is poured into 800 parts of ice and water and the precipitated dye is filtered, washed acid free, and dried. It is a brown compound which dissolves with a yellow-brown shade in water and dyes wool from an acid bath in yellow-brown shades.

A similar dye can be obtained if instead of the 1-amino-5-chloro-anthraquinone, one starts with 1-amino-4-chloro-anthraquinone.

*Example 5*

Twenty parts of the condensation product of 1-amino-4-chloro-anthraquinone and C-acetyl-1:9-thiophene-anthrone-2-carbonyl chloride are reacted with 16 parts of beta-naphthylamine in the presence of 20 parts of potassium acetate, 170 parts of naphthalene and 0.5 part of copper acetate at 215–220° C. for 8 hours. The color of the mass changes from brownish-yellow to green. When the condensation is completed, the mass is diluted with 360 parts of solvent naphtha and held at 100–110° C. for an additional two hours. It is then filtered and the green residue washed with 100 parts of solvent naphtha. It is further washed with ethyl alcohol and hot water and dried at 100–110° C.

It consists of the following compound

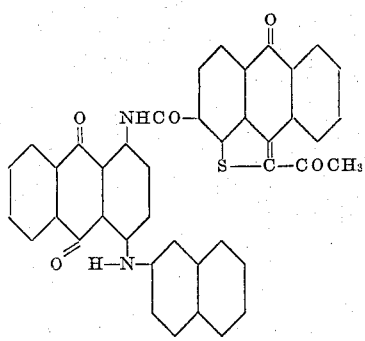

Ten parts of the above compound are dissolved in 100 parts of sulfuric acid monohydrate and allowed to agitate until thoroughly dissolved. The color of the solution is a Bordeaux shade which changes to a brown color when the sulfonation mass is heated to 40° C. When sulfonation is complete, the solution is poured into 1000 cc. ice and water and the precipitated dye is filtered, washed acid-free with brine and dried. It dissolves in water with a brown shade and dyes wool in khaki shades.

The sulfonation of these compounds and ring-closure may be done simultaneously or successively. The temperatures employed for the sulfonation may be between 30° C. and 100° C. depending on the strength acid used and the particular compound which is to be sulfonated. It is believed that ring closure of the carbazole nucleus takes place with 100% sulfuric acid because of the change in solution color during that treatment. While the nature of the ring closure condensation reaction has not been proved it is generally assumed to be a conversion of the naphthylamino-group to a carbazole ring as illustrated in the introduction to the specification and in this specification that nomenclature is used to represent the compounds actually produced by the process herein described even if some different configuration is later found to be a more correct representation of these molecules.

Other acid chlorides of the anthraquinone series may be substituted for those used in the specific examples to give dyestuffs of similar dyeing properties but which dye in different shades. Among those which may be mentioned are 1:9-anthrapyridone-2-carbonyl chloride, 1:9-pyrazol-anthrone-2-carbonyl chloride, 1-nitro-anthraquinone-6-carbonyl chloride, 2:1-anthraquinone thioxanthone-6-carbonyl-chloride, anthraquinone-2-carbonyl chloride, etc.

The condensation of the acid chlorides of the anthraquinone series with the amino-halogen-anthraquinone may be carried out in any suitable solvent such as nitrobenzene, dichlorobenzene, toluene, dioxan, etc. Temperatures of from 30° C. to 170° C. may be employed, depending upon the particular compounds reacted. The condensation of the naphthylamine with the halogen derivative may likewise be effected in inert solvents such as naphthalene, orthodichlorobenzene, nitrobenzene, etc.

Further substitution derivatives of the 1-amino-4-halogen- or 1-amino-5-halogen-anthraquinone may be employed such as 1-amino-2,4-dibromo-anthraquinone, 1-amino-2-methyl-4-bromo-anthraquinone, etc.

I claim:
1. The water soluble sulfonation derivatives of 1,2-anthraquinone-naphthcarbazoles which carry in one of the positions 4 and 5 an aroylamino-group of the anthraquinone series which contains not more than 5 condensed rings.
2. The water soluble sulfonation derivatives of 1,2-anthraquinone-2′,1′-naphthcarbazoles which carry in one of the positions 4 and 5 an aroyl-amino-group of the anthraquinone series which contain not more than 5 condensed rings.
3. The water soluble sulfonation derivatives of the 4-aroylamino-1,2-anthraquinone-2′,1′-naphthcarbazoles in which the aroylamino-group is of the anthraquinone series and carries the carbonyl group on the anthraquinone nucleus.
4. The water soluble sulfonation derivatives of the 5-aroylamino-1,2-anthraquinone-2′,1′-naphthcarbazoles in which the aroylamino-group is of the anthraquinone series and carries the carbonyl group on the anthraquinone nucleus.
5. The water soluble sulfonation derivative of the compound having the formula

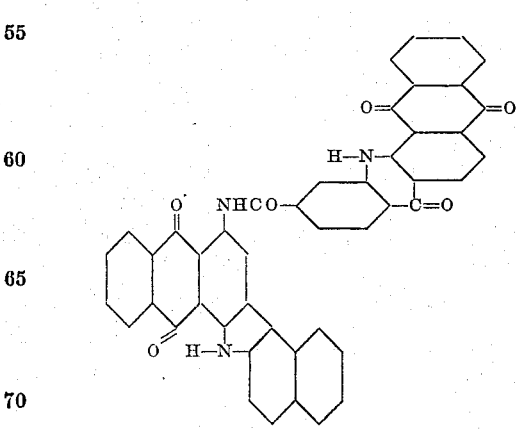

which dyes wool in brown-red shades having level dyeing properties.

6. The water soluble sulfonation derivative of the compound having the formula
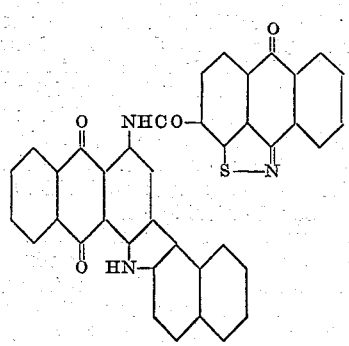
which dyes wool in brown shades.
7. The water soluble sulfonation derivative of the compound having the formula
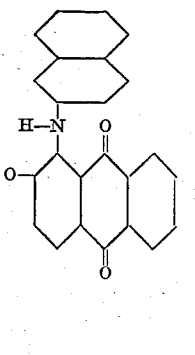
which dyes wool in orange-yellow shades.
EDWIN C. BUXBAUM.